US010032188B1

(12) United States Patent
Jakobi et al.

(10) Patent No.: US 10,032,188 B1
(45) Date of Patent: Jul. 24, 2018

(54) AUDIENCE DEFINITION BASED ON VIDEO DATABASE USAGE

(75) Inventors: Nick Jakobi, Zurich (CH); Michael Hatscher, Zurich (CH); Steven Dropsho, Zurich (CH); Reto Strobl, Walenstadt (CH); Oliver Heckmann, Rueschlikon (CH); Andras Nemeth, Zurich (CH); Thierry Le Boulengé, Zurich (CH); Tamas Foldenyi, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 1449 days.

(21) Appl. No.: 12/402,436

(22) Filed: Mar. 11, 2009

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0241* (2013.01); *G06Q 30/0242* (2013.01); *G06Q 30/0244* (2013.01); *G06Q 30/0251* (2013.01); *G06Q 30/0253* (2013.01); *G06Q 30/0255* (2013.01); *G06Q 30/0271* (2013.01)

(58) Field of Classification Search
CPC .......... G06Q 30/0269; G06Q 30/0271; G06Q 30/0255; G06Q 30/0253; G06Q 30/0251; G06Q 30/0244; G06Q 30/0242; G06Q 30/0241
USPC ......... 705/14.66, 14.67, 14.53, 14.51, 14.49, 705/14.43, 14.41, 14.4
See application file for complete search history.

(56) References Cited

U.S. PATENT DOCUMENTS

| 5,848,396 A * | 12/1998 | Gerace ................ G06Q 30/02 705/14.49 |
| 2003/0124973 A1* | 7/2003 | Sie et al. .................... 455/2.01 |
| 2003/0172376 A1* | 9/2003 | Coffin, III ............ G06Q 30/02 725/22 |
| 2003/0206720 A1* | 11/2003 | Abecassis ...................... 386/83 |
| 2005/0096978 A1* | 5/2005 | Black ............................ 705/14 |
| 2005/0144065 A1* | 6/2005 | Calabria ................ G06Q 30/02 705/14.68 |
| 2006/0129458 A1* | 6/2006 | Maggio ................. G06Q 30/02 705/14.2 |
| 2008/0092159 A1* | 4/2008 | Dmitriev et al. .............. 725/34 |
| 2008/0109306 A1* | 5/2008 | Maigret et al. ................ 705/14 |
| 2008/0195460 A1* | 8/2008 | Varghese .............. G06Q 30/02 705/14.25 |
| 2009/0222327 A1* | 9/2009 | Willis ............................ 705/10 |
| 2009/0320059 A1* | 12/2009 | Bolyukh ....................... 725/32 |

OTHER PUBLICATIONS

Veoh Launches New Behavioral Targeting Solution for Online Video Ads and Branded Content, Jun. 14, 2008 at http://www.veoh.com/corporate/pressroom/article/07_14_2008.

* cited by examiner

*Primary Examiner* — Raquel Alvarez
(74) *Attorney, Agent, or Firm* — Lowenstein Sandler LLP

(57) ABSTRACT

A graphical interface is provided that enables advertisers to iteratively define an audience of video database users that is most likely to purchase the good or service they are advertising and view detailed information associated with the audience.

35 Claims, 11 Drawing Sheets

YouTube

Sponsorship Marketplace

| Summary: | | |
|---|---|---|
| Maximum available target audience | Unique Visitors / Week | Views / Week |
| | 15 M | 60 M |

⟨ Who do you want to reach? ⟩ ⟨ Where do you want your ads to show? ⟩ ⟨ Checkout ⟩

Specify the audience you want to reach or just specify the video content you want to advertise on.

What are they interested in? — 321
Browse the tree and select your target audience's interest topics.

| All interest topics | |
|---|---|
| › Autos & Vehicles | Add » |
| ˅ Comedy | Add » |
|    Animation | Add » |
|    Bloopers | Add » |
|    Pranks | Add » |
|    Short Films | Add » |
|    Sketches | Add » |
|    Sketches | Add » |
|    Spoofs | Add » |
|    Stand-up & Improv | Add » |
|    Video Blogs | Add » |

— 325

| Seleted interest topics | |
|---|---|
| Autos & Vehicles | «Remove |

— 335

Who are they? — 321
Indicate the target audience's gender and age range
Genders for all age groups    Age — 390
☑ Male    13 — 65+
☑ FeMale Which countries are they from? [countries ˅] — 380
Select all applicable countries

[Australia ×] [United States ×]

— 385

Advanced options

Next, specify which videos you wnat your ads to show or proceed directly to checkout.

[ Continue » ] [ Cancel ]

YouTube Insights for Audience

Audience: Users that are Male and from US and into Beauty & Personal Care

| In the last week: | Unique users: 5.8 M | Search views: 67.7 M | Partner watch views: 10.6 M | permalink

Demographics: Your audience's age, gender, and origin

Their age ranges: 13-17, 18-24, 25-34, 35-44, 45-54, 55-64, 65 (0 25 50 75 100)

Their genders: Male / Female

Countries they're from

Interests: Your audience's likes / dislikes

Top level video categories: —540
- Beauty & Personal Care
- Science
- Online Communities
- News & Current Events
- Travel
- Computers & Electronics
- Animals
- Reference/How-To & Expert Content
- Sports
- Automotive
- Entertainment/Movies
- Games
- Lifestyles
- Entertainment/Music
- Entertainment Example videos this audience watches.

Search terms they're using

3oh 3  ab workout  abs  anjelah johnson  arnold schwarzenegger arnold schwarzenegger  bodybuilding bench press bodybuilding  bon qui qui  boxxy denise austin dexter jackson  don-t trust me farting  preacher fred  free running funny  funny accidents  funny pranks jay cutler jo koy lil wayne my new haircut my new hair cut  original p90x p90x results  parkour richard sandrak ronnie coleman steroids tattoo tech deck treadmill accidents Unforgivable weight gain weight lifting accidents wii fit workout worlds strongest man  yoga

AUDIENCE DEFINITION BASED ON VIDEO DATABASE USAGE

FIELD

The present invention is generally related to the identification of information that can be used to define an audience of video database users. In particular, the present invention is directed to an engine that provides advertisers with detailed information associated with defined audiences of video database users derived from the video database users' interaction with a video database.

DESCRIPTION OF THE RELATED ART

The proliferation of media hosting web sites that host multimedia content (e.g., music content and video content) for mass viewing has enabled users of the web sites to browse and access large amounts of media content. This media content can be user-generated content (i.e. content that is generated by a user of the media hosting website) or content that is owned and provided by a third party such as a television network.

In some instances, the media content may be monetized, that is, provided to users of the web site in conjunction with advertising content in exchange for funds. For example, a user may be presented with a short commercial before being allowed to view video content. Alternatively, a user may be presented with information describing a product or service before being allowed to view the video content. In order to monetize content, the media hosting web site typically allows the advertiser to "bid" or specify an amount of funds they will provide to the media host in exchange for the media host providing advertising content in association with specific items of media content. The media host may provide the advertisers with information that describes the specific items of media content such as the frequency with which an item of media content is viewed so that the advertisers have a better understanding of the number of users their advertising content will be displayed to. The media host may provide advertisers with information about the content of videos upon which they can place advertisements (e.g., place ads on videos about cats). Similarly, the media host may provide allow advertisers to place their advertisements in connection with certain search terms entered on the site (e.g., place ads on video search results when the user types in "cats"). This method of placing ads is centered on the search terms entered by a particular user or particular video being watched by a user.

SUMMARY

The insight system enables advertisers to define an audience of video database users that are most likely to purchase the product or service the advertiser wishes to sell based on demographic information, geographic information, activity information and viewing information derived form the users' interaction with a video database. The insight system further identifies viewing groups comprised of users with greater-than-average interest in different categories of videos based on the frequency with which the users view video content associated with the categories and allows the advertiser to define audiences based on the viewing groups.

The insight system further provides a graphical user interface that displays detailed information associated with the defined audience of video database users. The detailed information associated with the audience includes information derived from the demographic information, geographic information, viewing information, and activity information provided by the video database users. The detailed information associated with the audience includes videos frequently viewed by the audience; search terms frequently used by the audience; and the audience's relative interest in categories of video content. Using the detailed information, an advertiser can characterize the audience most likely to purchase the goods or service they wish to advertise. Also, the advertiser may wish to iteratively re-define the audience most likely to purchase the goods or service they wish to advertise based on the displayed detailed information.

In one embodiment, advertisers bid to display advertising content to the audience of users. The system provides users who are associated with an audience with advertising content. The system tracks activity information describing the number of times the advertising content is displayed to users and the number of unique users the advertising content is provided to. The insight system receives funds from the advertiser based on the activity information.

BRIEF DESCRIPTION OF THE DRAWINGS

FIG. 3 is a screenshot illustrating a graphic user interface 300 for defining an audience according to one embodiment.

FIG. 4 is a screenshot illustrating a graphic user interface 400 for defining an displaying detailed information associated with an audience according to one embodiment.

FIGS. 5-10 are screenshots illustrating a graphic user interface 500 for defining an displaying detailed information associated with an audience according to another embodiment.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
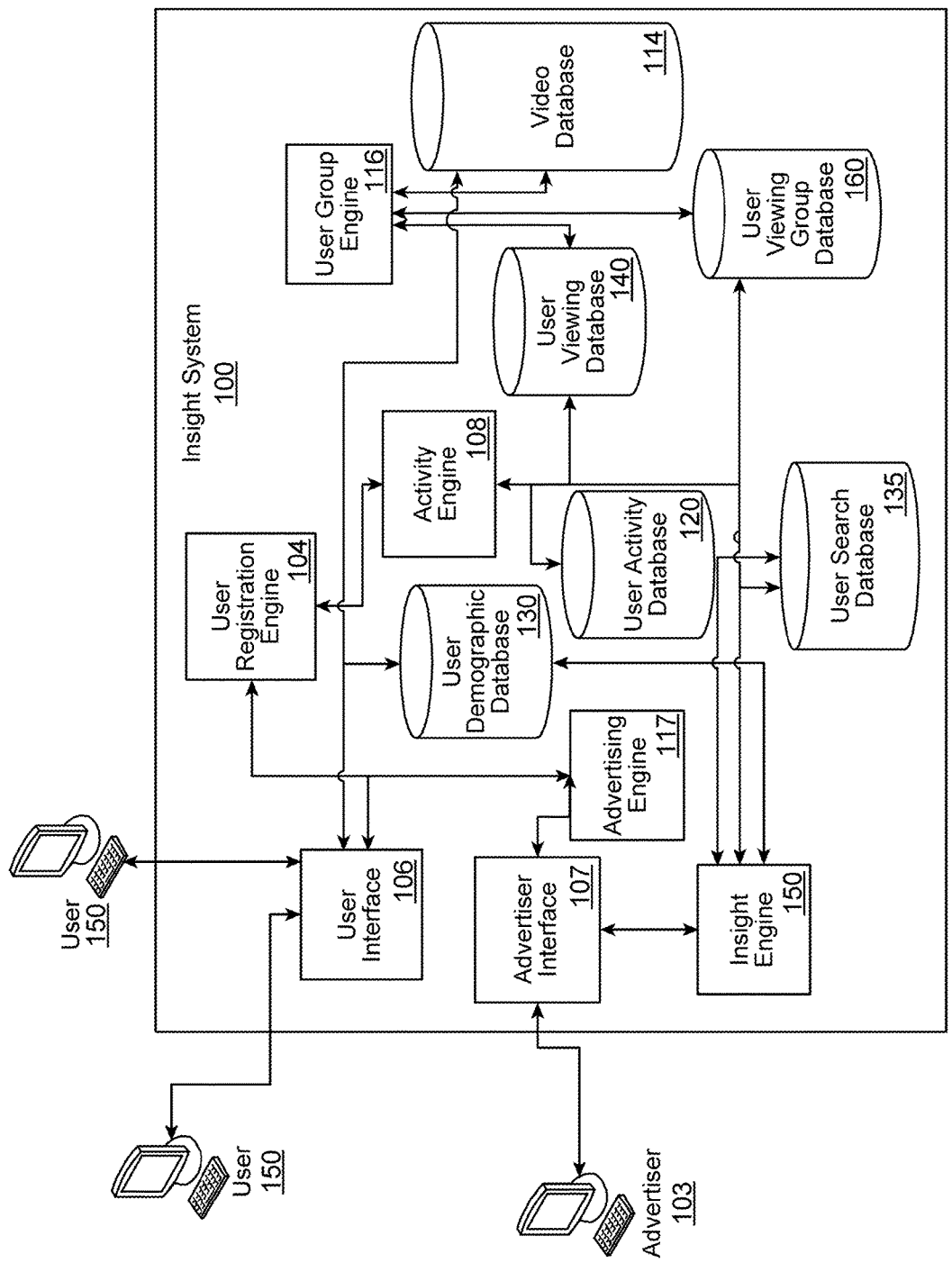
FIG. 1 is an illustration of an insight server 100 in accordance with an embodiment of the present invention.

FIG. 1 illustrates a system for characterizing an audience in accordance with an embodiment of the present invention. The insight system 100 includes a user interface 106, a user registration engine 104, a user group engine 116, an activity monitoring engine 108, an advertiser interface 107, an insight engine 250, a user demographic database 130, a user activity database 120, a user viewing database 140, a user viewing group database 160 and a user search database 135. FIG. 1 also includes two user systems 150 and an advertiser system 103. Each of these is described further below.

The user system 150, advertiser system 103, and the insight system 100 each comprise one or more computer systems, each computer system comprising a memory and a processor. The user system 150, advertiser system, and the insight system 100 can be a laptop, desktop, cell phone, handheld device, thin or thick client device, or any other appropriate computing platform. In most embodiments, the insight system 100 will comprise one or more server computers (e.g. blade servers), where the one or more server computers exclusively perform the functions of the insight system 100. It will also be understood that the described uploading of video content by the user system 150 is not intended to be limited to content uploaded or downloaded via the Internet or the http protocol. Further, in general, functions described in one embodiment as being performed by the insight server 100 can also be performed by the advertiser system 103 and/or the user system 150 in other embodiments if appropriate.

The insight system 100 is maintained by a media host that maintains the video database 114 and provides video content stored in the video database 114. In other embodiments, the insight system 100 may receive user information from a third party media host in conjunction with the video database 114 maintained by the media host.

The users 150 access the video database 114 via the user interface 106. The user interface 106 provides controls and elements that allow the user to browse or search video content within the video database 114 and view video content within the video database 114. The user interface 106 further provides controls that allow the user to upload video content to the video database 114.

The user interface 106 further provides controls that allow the users 150 to register to access the video database 114. Upon registration, the user 150 provides demographic information, contact information (e.g. an email address), a user name (or other information that uniquely identifies the user 150) and a password. According to the embodiment, the user 150 may provide demographic information including age, geographic location, gender and interests. The user registration engine 104 communicates with the user interface 106 to store and access the user registration information. The user registration engine 104 stores the user registration information in association with unique identifiers for the users (e.g. the user name of the user 150, the email address of the user 150) in the user demographic database 130. The user registration engine 104 communicates with the user interface 106 to retrieve password, contact and/or user names for the users 150 from the user demographic database 130 for verification purposes when the users 150 log in to access the video database 114.

The user registration engine 104 further communicates with the activity engine 108 to provide data associated with the users 150 when the users 150 access the video database 114. The activity engine 108 communicates with the user interface 106 and the video database 114 to record the activities that the users 150 perform using the video database. The activity engine 108 receives unique identifiers for the registered users 150 from the user registration engine 104 and stores the recorded user activity information for the users 150 in association with the unique identifiers for the users 150.

The activity engine 108 can record and store any type of information associated with the activities the users 150 perform using the video database 114. The activity engine 108 records the search terms the users 150 use to search the video database 114 and stores the search terms in the user search database 135. The activity engine 108 records information indicating the video content the users 150 view and stores the viewing information in the user viewing database 140. Information indicating the video content the users 150 view or "viewing information" can include: the duration of an item of video content viewed, the number of videos the users 150 watch when they log in to access the video database 114 and a number of times an item of video content is viewed by a user 150. The activity engine 108 records activities performed by the users 150 and stores the activities in the user activity database 120. Activities performed by the users 150 can include: the number of times the users 150 access the video database 112 (e.g. the number of times the users 150 log into the video database 112), comments on video content provided by the users 150, ratings for video content provided by the users 150, video content uploaded by the users 150 and sharing of video content by the users 150. Sharing of video content, as used herein, refers to the user's 150 transmission of links, emails or other information containing references to video content to other users 150.

The user group engine 116 communicates with the user viewing database 140 and the video database 114 to further refine the information stored in the user viewing database 140. Items of video content stored in the video database 114 are stored in association with "verticals" or categories indicating specific types of video content. The categories can indicate any group of video content with similar characteristics, for example, a genre or a subject of video content. Based on the information stored in the user viewing database 140, the user group engine 116 determines an average frequency with which users 150 view video content associated with each category. For each user 150, the user group engine 116 determines whether the user 150 views video content associated with each category at a frequency that is significantly higher or significantly lower than the average frequency with which users 150 view video content associated with the category. If the user 150 views video content associated with a category at a frequency that is significantly higher than the average frequency, the user 150 is associated with a "viewing group" of users 150 with higher-than-average interest in an interest topic corresponding to the category associated with the viewing group. The user group engine 116 stores viewing group information indicating categories of video content and the users 150 who view videos associated with the categories of video content in the user viewing group database 160.

The advertisers 103 access the insight system 100 through the advertiser interface 107. Using the advertiser interface 107, the advertisers 130 can define an audience of users 150 they feel is most likely to purchase their product or service that they seek to advertise. The advertisers 130 can define the audience of users 150 based on demographic information, geographic location information and viewing group information. For example, an advertiser 103 seeking to market a beauty product within North America may define an audience of users 150 within Canada, Mexico and the United States between the ages of 15-30, who are associated with a viewing group of users who view videos associated with the category 'Beauty & Personal Care' at a higher-than-average rate.

The insight engine 150 combines information stored in the user viewing group database 160, the user viewing database, the user demographic database 130 and the user activity database 120 to provide the advertiser 103 with detailed information about the audience. The detailed information about the audience can include video content that is frequently viewed by the audience, search terms that are frequently used by the audience, the activities frequently performed by the audience, the audience's relative interest in different categories of video content and detailed demographic information associated with the audience. Video content that is frequently viewed by the audience may be displayed in association with the categories or verticals. In some embodiments, if the audience is defined based on a viewing group, the advertiser 103 may be presented with other viewing groups the audience has association with.

Providing the advertiser 103 with the detailed information associated with the audience allows the advertiser 103 to characterize the audience based on their activities, tastes, interests and behaviors as indicated by the video content that they frequently view, the search terms they frequently use and the behaviors/activities associated with the audience. For instance, an advertiser 103 may define an audience of male users with a greater than average interest in automobiles and view information indicating their relative interest in news and current events, taste in music (as indicated by the music videos the audience frequently views) and sense of humor (as indicated by the comedy videos the audience frequently views). This characterization provided by the detailed information associated with the audience allows the advertiser 103 to better develop and direct advertising content to the user.

Based on the information provided by the insight engine 150, the advertisers 103 can refine or modify their definition of an audience of viewers they feel is most likely to purchase their product or service which they seek to advertise. For instance, an advertiser 103 may determine that only a subgroup of the audience they originally defined is likely to purchase their product or service based on the different sub-categories of videos that are most frequently watched by the viewing group. In this way, the advertisers 103 can "browse" audiences of users by re-defining different audiences, allowing the detailed information associated with the different audiences to guide them as to the correct definition of the audience most likely to purchase their product or service.

Once the advertisers have defined an audience that is most likely to purchase the goods and/or services they are advertising, the advertisers 103 may use the advertiser interface 107 to place bids specifying an amount of funds they are willing to provide to the media host who maintains the insight server 100 in exchange for displaying their advertising content to the audience. The insight server 100 may provide any form of digital advertising content to the users including: video advertising content, audio advertising content, program code encoding an executable interactive program, hyperlinks to web pages containing advertising content and textual advertising content.

The advertising engine 117 communicates with the advertising interface to receive the bids and advertising content provided by the advertisers 103. The advertising content provided by the advertisers 103 may be textual advertising content, a link to a web page, program code (e.g. program code for an interactive advertisements), audio advertising content or video advertising content. The advertising engine 117 communicates with the user interface 106 to provide the advertising content to the audience of users 150, tracking activity information that specifies the number of times the advertising content is provided to the audience of users 150 and the number of unique users 150 in the audience that the advertising content is provided to. The advertising engine 117 further functions to receive funds from the advertisers based on the activity information.

Figure 2:
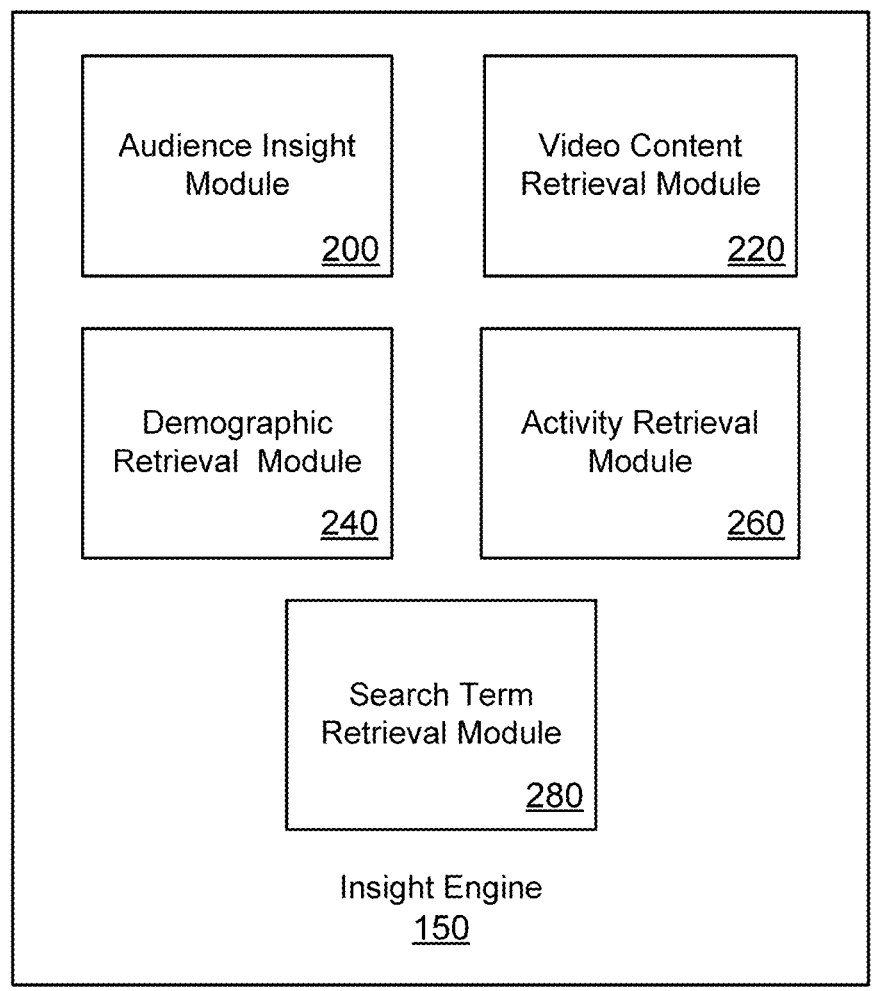
FIG. 2 is a high-level block diagram illustrating a detailed view of the insight engine 150 according to one embodiment.

FIG. 2 is a block diagram illustrating a detailed view of the insight engine 150 according to one embodiment. As shown in FIG. 2, the insight engine 150 includes multiple modules. Those of skill in the art will recognize that other embodiments of the insight engine 150 can have different and/or other modules than the ones described here, and that the functionalities can be distributed among the modules in a different manner.

The audience insight module 200 communicates with the advertiser interface 107. The audience insight module 200 receives definitions of audiences from the advertiser interface 107 and transmits detailed information associated with the audiences to the advertiser interface 107. According to one embodiment, the received definition of the audience may include: a selection of a range of ages of users 150 in the audience, a selection of one or more topics representing viewing groups associated with users 150 in the audience, a geographic location associated with users 150 in the audience, a gender associated with users 150 in the audience or activities associated with users 150 in the audience. The audience insight module 200 communicates with the user demographic database 130, the use activity database 120 and the user viewing group database 160 to retrieve a set of unique identifiers for users 150 who correspond to the audience definition.

The audience insight module 200 transmits the set of unique identifiers to the video content retrieval module 220, the demographic retrieval module 240, the activity retrieval module 260 and the search tem retrieval module 280. The demographic retrieval module 240 communicates with the user demographic database 130 to retrieve detailed geographic, demographic and gender information associated with an audience of users 150 based on the set of unique identifiers. The detailed geographic information may include a set of geographic locations associated with the audience of users 150 and the percentage of the audience of users 150 associated with each geographic location. The detailed gender information associated with the audience of users 150 may include the percentage of the audience of users 150 associated with each gender. The activity retrieval module 260 communicates with the user activity database 120 to retrieve detailed activity information corresponding to an audience of users 150 based on the set of unique identifiers. The search term retrieval module 280 communicates with the user search database 135 to retrieve search terms frequently used by an audience of users 150 based on the set of unique identifiers. According to the embodiment, the search terms frequently used by the audience of users may be the search terms that are most frequently used by the audience of users or the search terms that are more frequently used by the audience of users than all users of the video database.

The video content retrieval module 220 communicates with the user viewing database 140 and the user viewing group database 160 to retrieve information describing videos that are frequently viewed by the users 150 in the audience based on a set of unique identifiers associated with users 150 in the audience. Information indicating videos that are frequently viewed by the users 150 may include: a frequency with which each video is viewed by the audience 150, videos associated with a set of categories of video content that are most frequently viewed by the audience 150, the number of times per week the audience accesses the video database 114 and the number of users 150 within the audience 150 who access the video database 114 each week.

The audience insight module 200 receives detailed information from the video content retrieval module 220, the demographic retrieval module 240, the activity retrieval module 260 and the search term retrieval module 280. The audience insight module 200 transmits the detailed information to the advertiser interface 107.

FIG. 3 illustrates a screenshot of a user interface 300 according to one embodiment of the advertiser interface 107. The user interface 300 enables an advertiser to define an audience.

In the illustrated example, a topic selection region 325 displays set of interest topics corresponding to categories of video content associated with viewing groups (i.e. the categories of video content associated with viewing groups are the same as the interest topics). In the illustrated embodiment, the categories correspond to "interest topics". In other embodiments the categories may correspond to any type of class or group of video content with similar characteristics. The topic selection region 325 displays a hierarchy of categories ("parent categories") and sub-categories that advertisers 103 may navigate by selecting the parent categories. The topic selection region 320 further comprises controls 321 that enable the advertisers 130 to add a viewing group associated with a category or a sub-category corresponding to an interest topic to a definition of an audience. The user interface 300 further comprises a selected topics region 335 that displays the viewing groups the advertisers has selected to add to the audience definition. In the illustrated example, the selected topics region 335 indicates that the advertiser has defined the audience to include users 150 associated with a viewing group with a higher-than-average interest in "Autos & Vehicles".

The user interface 300 further comprises a gender selection control 370 that enables the advertiser 130 to select to include male and or female users 150 in the audience definition. In the illustrated example, the gender selection control 370 indicates that the advertiser 103 has selected to include male and female users 150 in the audience. The user interface 300 further comprises an age selection control 390 that enables the advertiser to select an age range of users in the audience definition. In the illustrated example, the gender selection control 390 indicates that the advertiser 103 has selected to include users 150 ranging from age 13 to users that are older than 65 in the audience. The user interface 300 further includes a country selection tool 380 that enables the advertiser to select one or more countries associated with the users 150 in the audience. The user interface 300 further includes a country display area that displays the countries selected by the advertiser 103. In the illustrated example, the gender selection control 390 indicates that the advertiser 103 has selected to include users 150 located in Australia and the United States in the audience.

The user interface 300 further allow a control 350 that enables the advertiser 103 to submit the audience definition to the insight server 100 in order to retrieve detailed information associated with the audience. In some embodiments, the user interface 300 further contains controls which enable an advertiser 103 to elect to retrieve only video content provided by partners of the entity that maintains the video database 114 and/or the insight server 100 in the detailed information associated with the audience. The advertiser 103 may also elect to retrieve only video content that does not contain adult subject matter.

Figure 4:
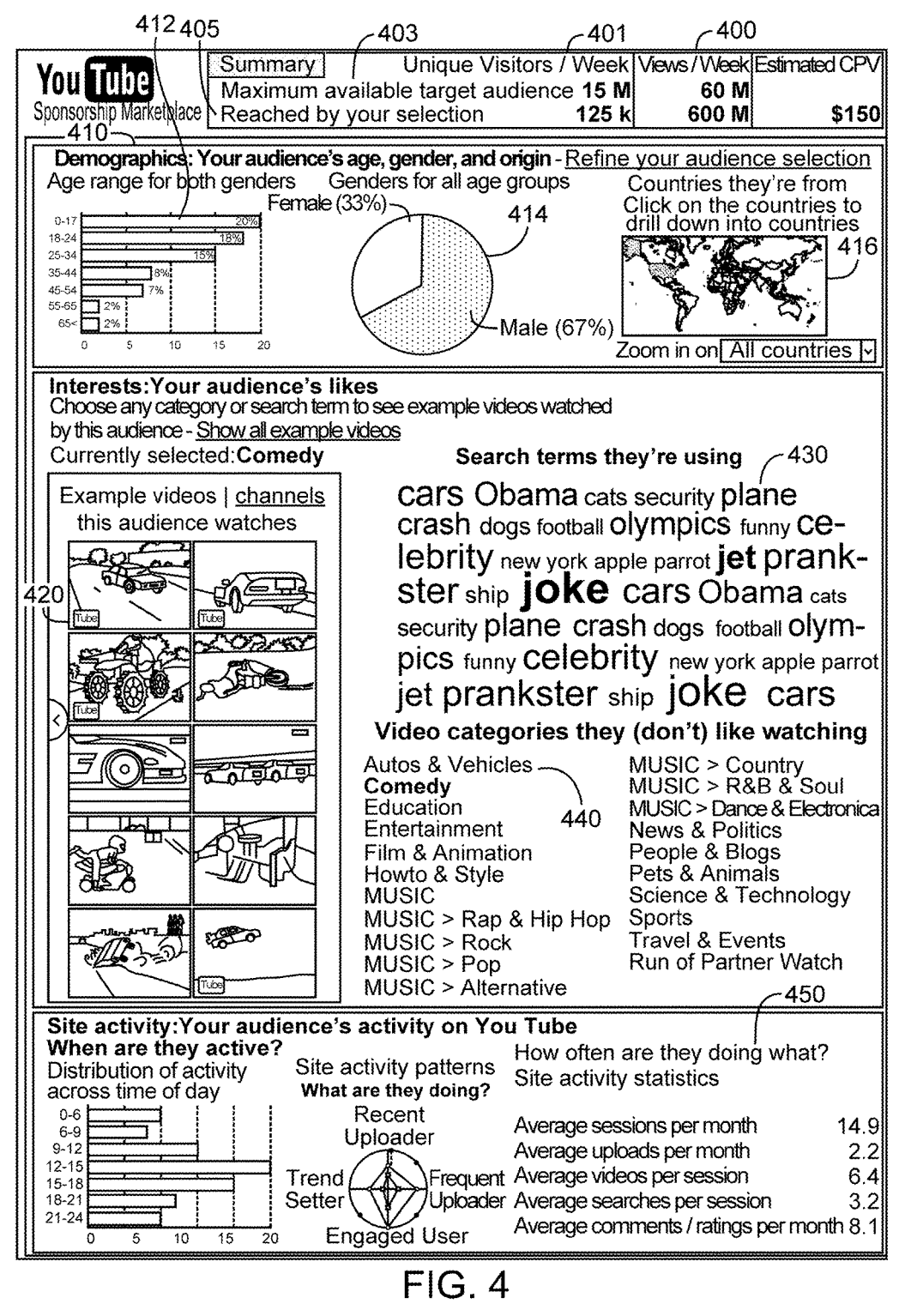

FIG. 4 illustrates an example of a user interface 400 according to one embodiment of the advertiser interface 107. The user interface 400 enables an advertiser 103 to view detailed information associated with an audience defined by the advertiser 103. In the example illustrated in FIG. 4, the audience defined by the advertiser 103 comprises users 150 associated with a viewing group of users within the United Stated of America that has been determined to have a higher-than-average interest in the category "Autos & Vehicles".

The user interface 400 comprises a summary display section 401 that displays viewing information associated with all of the users 150 of the video database 114 and the audience of users 150 defined by the advertiser 103. In the embodiment illustrated, the summary display section 401 displays viewing information associated with a "maximum available target audience" 403 that represents all of the users 150 that access the video database 114. The summary display section 401 further displays viewing information associated with the audience "reached by your selection" 405 that represents the subset of users 150 in the audience defined by the advertisers. A number of unique users 150 who access the video database 114 per week (displayed as unique visitors per week) is displayed for the "maximum available target audience" 403 and the "audience reached by your selection" 405. A number of videos viewed by the users 150 is displayed for the "maximum available target audience" 403 and the audience "reached by your selection" 405.

The user interface 400 comprises a demographics display section 410 that displays detailed demographic information associated with the audience. In the embodiment illustrated, the demographics display section 410 displays a histogram 412 indicating the percentage of the audience users 150 associated with a series of age groups, a pie chart 414 indicating the percentage of male and female users 150 in the audience and a map 416 indicating the geographic locations of the users 150 in the audience.

The user interface 400 further comprises a video thumbnail wall section 420 that displays indicia representing the videos that are most frequently watched by the audience. In the embodiment illustrated, small images (i.e. thumbnails) are used to represent the videos that the users 150 in the audience most frequently watch. In the embodiment illustrated, the video thumbnail wall section 420 displays images representing videos within a specific category. For audiences that are defined based on a viewing group, the category of videos displayed in the video thumbnail wall section may, but does not necessarily need to, correspond to a viewing group selected by the advertiser 103 to define the audience of users 150.

The user interface 400 further comprises a search term section 430 that displays the search terms that are most frequently used by the users 150 in the audience to query the video database 114. In the embodiment illustrated, the search terms displayed in different font sizes and/or bolded based on the frequency with which the users 150 in the audience use the search terms to query the video database 114. In other embodiments, the search terms may be displayed in other ways to indicate the frequency with which the users in the audience use the search terms. For example, the search terms may be displayed in ranked order to indicate the frequency with which the users 150 in the audience use the search terms to query the video database 114.

The user interface 400 further contains a video categories section 440 which provides information indicating the other categories of videos in association with the audience's relative interest in the categories. The audiences' relative interest in the categories is based on the frequency with which the user watches videos within the category. In the embodiment illustrated, the categories of videos are displayed in different font sizes and/or bolded based on the frequency with which the users 150 in the audience view videos associated with the categories. In other embodiments, the video categories may be displayed in other ways to indicate the frequency with which the users in the audience view videos associated with the categories. For example, the search terms may be displayed in ranked order to indicate the frequency with which the users 150 in the audience view videos associated with the categories of videos.

The user interface 400 further comprises a site activity section 450 that displays information describing the activities the audience of users 150 perform when accessing the video database 114. In the embodiment illustrated, the site activity section 450 displays a histogram indicating a distribution of user activity over the times of day when the users 150 are active. The site activity section 450 further displays a graph that indicates whether the users are recent uploaders of video content, frequent uploaders of video content, trend setters (i.e. users who view or share video content prior to a sharp increase in the popularity of the video content) or engaged users of the video database 114 (i.e. users who upload video content, rate video content, comment on video content or respond to video content at a higher rate than average users). The site activity section 450 further displays statistics that indicate how the users 150 in the audience use the video database 114. The statistics include the average "sessions" of the user 150 in the audience per month, where a session represents each time the user logs in to access the video database 114. The statistics further include the average number of times the users 150 in the audience upload video content to the video database 114. The statistics further include the average number of videos the users 150 in the audience view per session. The statistics further include the average number of searches the users 150 perform per session. The statistics further include the average number of comments and/or ratings the user 150 provides per month.

FIG. 5 illustrates an example of a user interface 500 according to one embodiment of the advertiser interface 107. The user interface 500 enables an advertiser 103 to view detailed information associated with an audience defined by the advertiser 103. In the example illustrated in FIG. 4, the audience defined by the advertiser 103 comprises male users 150 in the United States of America associated with viewing group of users 150 that has been determined to have a higher-than-average interest in the category "Beauty & Personal Care".

Similar to the user interface 400 illustrated in FIG. 4, the user interface 500 comprises a summary display section 501, a demographics display section 510, a video thumbnail wall section 520, a search term section 530 and a video categories section 540 that perform the same function as the corresponding sections illustrated in FIG. 4. In the embodiment illustrated, the video categories section 540 displays bars that represent the audience's relative interest in the categories of video content based on the frequency with which users in the audience view videos associated with the different categories, where the size of the bar is proportional to the frequency. In the embodiment illustrated, the summary display section 510 displays the audience definition, the number of users 150 in the audience within the last week, the number of times the audience has viewed video content within the last week and the number of times the audience has viewed video content provided by partners of the media host who maintains the insight server 100 and/or the video database 114.

In the example illustrated, the video thumbnail wall section 520 displays small images ("thumbnails") representing videos corresponding to the category "Beauty & Personal Care" that are frequently viewed by the audience of male viewers associated with a viewing group with a higher-than-average interest in the category "Beauty & Personal Care". In the example illustrated, the thumbnails of the videos corresponding to this category are primarily comprised of images of male bodybuilders. Using a set of thumbnails to provide a graphic representation of the videos corresponding to a category provides important information to the advertiser 103 who wishes to direct advertising to an audience. For example, an advertiser who wishes to advertise a hair product for men may determine that this audience is not more likely to purchase their hair product as their interest in Beauty & Personal Care is primarily directed to bodybuilding. Based on this determination, the advertiser may wish to re-define the audience based on a selection of a sub-category of the category "Beauty & Personal Care."

This type of information associated with the audience enables an advertiser to better characterize and/or redefine the audience most likely to purchase the goods or services they wish to purchase. For instance, an advertiser 103 who wishes to advertise a product to an audience of bodybuilders may already be aware that the audience of users 150 most likely to purchase their product or service is primarily composed of young men. However, the demographics display section 510 in the selected example provides the advertiser with a complete age based breakdown of the users 150 in their audience, showing that the majority of the audience is within the age ranges of 18-24 and 25-34. Based on this breakdown, the advertiser may re-define the audience to only include men within the age ranges of 18-34.

The detailed information also enables the advertiser to identify interests of the audience that may be used to develop advertising content specific to the audience. In the example illustrated, a search term 588 for the actress "denise austin" is displayed in the search term section 530 in a larger font, indicating that the audience performed searches using this search term at a high frequency. Therefore, an advertiser 103 who seeks to develop an advertisement for a product that is likely to be purchased by an audience with a higher than average interest in bodybuilding such as a nutritional supplement for bodybuilders may seek to have a spokeperson who is popular with bodybuilders endorse their product.

Figure 6:

FIG. 6 provides an alternate view of the user interface 500 illustrated in FIG. 5. In this illustrated interface, the advertiser 103 has selected to view a video in the video thumbnail wall section 520. According to the embodiment, the advertiser 103 may select to view a video in the video thumbnail wall section 520 by clicking on an image representing the video (i.e. thumbnail). Responsive to the advertiser's 103 selection of the thumbnail, a pop-up window 610 comprising the video represented by the image is displayed. The pop-up window 610 comprises a set of controls 615 that enable the advertiser to view the video. In some instances, the video displayed within pop-up window 610 may further comprise annotations. In the example illustrated, the video displayed within the pop-up window comprises a text annotation 620 containing a link to a webpage.

Figure 7:
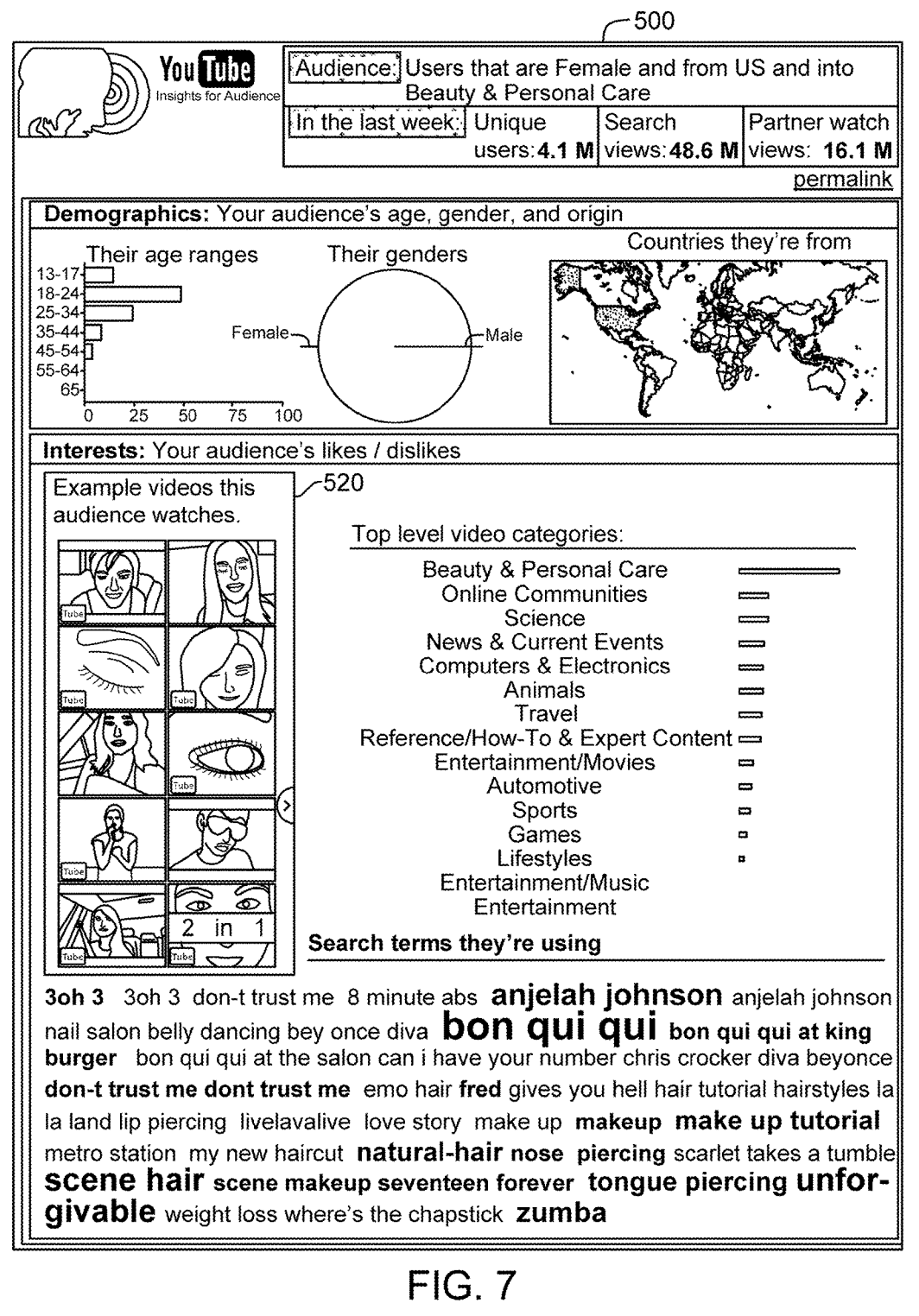

FIG. 7 provides an alternate view of the user interface 500 illustrated in FIG. 5. In the example illustrated in FIG. 7, the audience defined by the advertiser 103 comprises female users 150 within the United States of America that are associated with viewing group of users 150 that has been determined to have a higher-than-average interest in the category "Beauty & Personal Care".

In the example illustrated, the video thumbnail wall section 520 displays small images derived from videos corresponding to the category "Beauty & Personal Care" that are frequently viewed by the audience of female viewers within the United States of America that are associated with a viewing group with a higher-than-average interest in the category "Beauty & Personal Care". In the example illustrated, the thumbnails of the videos corresponding to this category are primarily comprised images of females wearing or applying cosmetics. These images provides important information to an advertiser 103 who wishes to direct advertising to this audience of users 150 such as the type of cosmetics that the audience is interested in. For instance, the advertiser may determine the type of cosmetics the audience is most interested in or the type of application instructions of the greatest interest to the audience.

Figure 8:

FIG. 8 provides an alternate view of the user interface 500 illustrated in FIG. 7. In this illustrated interface, viewing information 802 indicating the frequency at which a video represented by an image in the video thumbnail wall section 520 is viewed by the audience of users 150 is displayed. In the example illustrated, the viewing information 802 indicates the number of times within the last week that the audience viewed the video represented by the image as well as the number of times within the last week that all users 150 of the video database 114 viewed the video. The viewing information 802 is displayed responsive to the selection of the image by an advertiser 103. The advertiser 103 may select to display the viewing information 802, for example, by hovering a pointer over the image representing the video.

Figure 9:

FIG. 9 provides an alternate view of the user interface 500 illustrated in FIG. 8. In the example illustrated in FIG. 9, the audience defined by the advertiser 103 comprises male users 150 in the United Kingdom within the ages of 18-24 in Great Britain that are associated with viewing group of users 150 that has been determined to have a higher-than-average interest in the category "Cycling".

In the example illustrated, the video thumbnail wall section 520 displays small images derived from videos corresponding to the category "Cycling" that are frequently viewed by the audience of male viewers within the ages of 18-24 in Great Britain that are associated with a viewing group with a higher-than-average interest in the category "Cycling". The video categories section 540 provides another example of unexpected information associated with audience of users. The video categories section 540 displays a set of categories that are ranked according to the audience's interest in the category in association with bars that represent the audience's relative interest in the categories. In the example illustrated, it is noted that the audience has only a moderate interest in the category 'Sports', although the audience has a higher-than-average interest in the category 'Cycling' that is a sub-category of 'Sports'. This discrepancy can partially explained if the audience very rarely views other videos associated with the category "Sports" other than videos associated with the sub-category "Cycling". It is further noted, that the audience has a higher interest in the categories "Science" and "Travel" than the category "Sports" thus providing valuable insight into the other interests of the users 150 in the audience.

Figure 10:
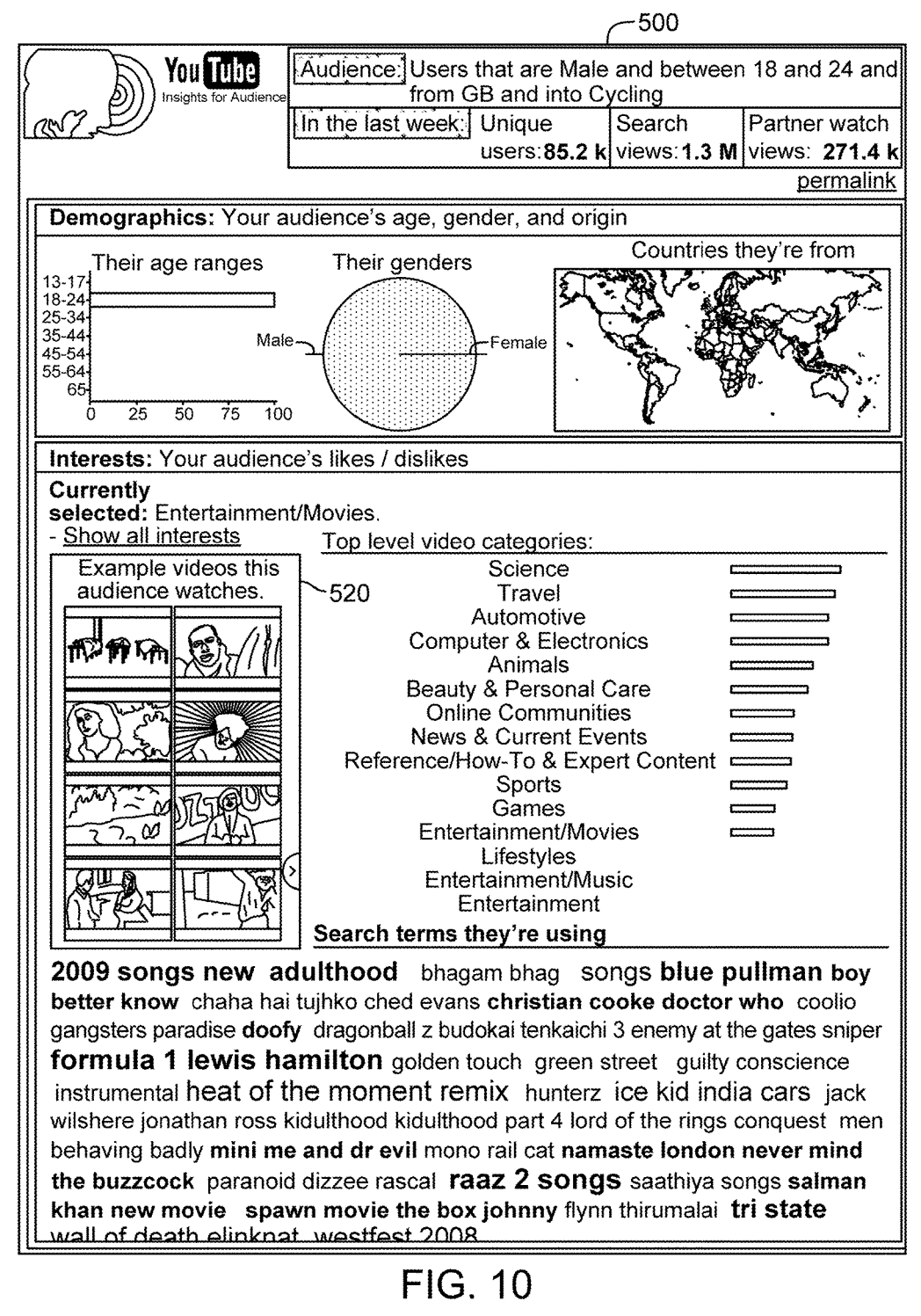

FIG. 10 provides another view of the user interface 500 illustrated in FIG. 9. As in the example illustrated in FIG. 9, the audience defined by the advertiser 103 comprises male users 150 within the ages of 18-24 in Great Britain that are associated with viewing group of users 150 that has been determined to have a higher-than-average interest in the category "Cycling".

In the example illustrated, the video thumbnail wall section 520 displays small images derived from videos corresponding to the category "Entertainment/Movies" that are frequently viewed by the audience of male viewers within the ages of 18-24 in Great Britain that are associated with a viewing group with a higher-than-average interest in the category "Cycling". The ability to select to view the video content such represents tastes and interests associated with an audiences such as the users 150 in the audience's taste in Movies, interest in News & Current events or taste in music allows the Advertiser 103 to better characterize the users 150 in the audience and get a sense of type of advertising content that would be persuasive to the users 150 in the audience. Using this information, the advertiser 103 may develop advertising content specifically target to the audience. For instance, by determining that an audience associated with a viewing group with a higher than average interest in Cycling frequently watches science fiction movies, an advertiser 103 may create advertising content that advertises bicycles with a look-and-feel similar to that of popular science fiction movies.

Figure 11:
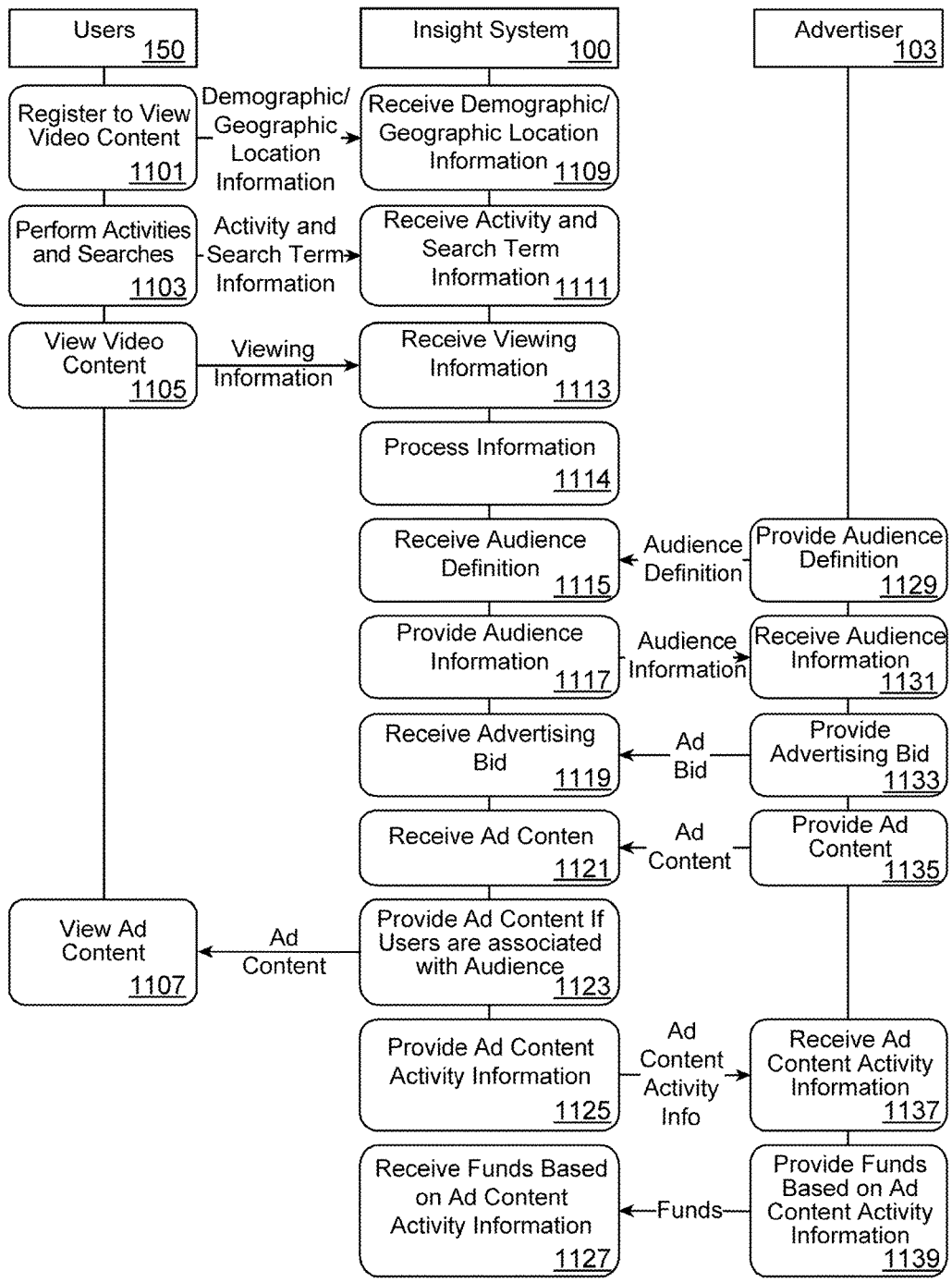
FIG. 11 is a process flow diagram illustrated actions performed by users 150, the insight serve 100 and am advertiser 103 according to one embodiment.

Once an advertiser has defined an audience of users 150 that are most-likely to purchase the good and or service they are advertising, they may bid to display advertising content to the audience. FIG. 11 is a process diagram illustrating the flow of information and funds between the users 150, the insight server 100 and the advertiser 103 according to one embodiment. In some embodiments, elements 1101, 1111, 1113, and 1114 also may be performed by a system different from the Insight system 100. In some embodiments, elements 1119, 1121, 1123, 1125, and 1127, also may be performed by a system different from the Insight system 100.

The users 150 register 1101 to view video content in the video database 114 providing demographic information and geographic location information to the insight system 100. The users 150 perform activities and searches 1103 using the video database 114, providing activity and search term information to the insight system 100. The users 150 view 1105 video content in the video database 114, providing viewing information to the insight system 100. The users 150 view advertising content 1107.

The insight system 100 receives 1109 demographic information and geographic location information from the users 150 and stores the demographic and geographic location information in the user demographic database 130. The insight system 100 receives 1111 activity and search term information from the users 150 and stores the search term information in the user search database 135 and the activity information in the user activity database 120. The insight system 100 receives 1111 viewing information from the users 150 and stores the viewing information in the user viewing database 140. The insight system 100 processes 1114 the viewing information to determine viewing groups of users with a higher-than-average interest in a category of video content based on the higher-than-average frequency of views of the content.

The insight system 100 receives 115 an audience definition from an advertiser 103. The insight system 100 provides detailed information associated with the audience to the advertiser 103. The insight system 100 receives 1119 an advertising bid associated with the defined audience from the advertiser 103. The insight system 100 receives 1121 advertising content 1121 from the advertiser 103. Responsive receiving requests from users 150 associated with the defined audience to view video content, the insight system 1123 provides 1123 the advertising content to the users 150 associated with the audience in conjunction with the video content, tracking advertising content activity information that describes the number of times the advertising content is provided to users 150, the number of times the users 150 in the audience interacted with the advertising content (e.g. a click through rate), and/or the number of unique users 150 associated with the audience that the advertising content is provided to. The insight system 1125 provides 1125 the advertising content activity information to the advertiser 103. The insight system 1127 receives funds from the advertiser based on the number of times the advertising content is provided to the users 150, the number of times the users 150 in the audience interacted with the advertising content (e.g. a click through rate), and/or the number of unique users 150 in the audience the advertising content was provided to.

The advertiser 103 provides 1129 an audience definition to the insight server 100. The advertiser 103 receives 1131 the detailed information associated with the audience from the insight server 100. The advertiser 103 (along with other advertisers) provides 1133 an advertising bid to the insight server 100, the advertising bid specifying an amount of funds the advertiser 103 is willing to provide in exchange for advertising content to provided to users 150 associated with an audience. The advertiser 103 (along with other advertisers) provides advertising content to the insight server 100, the advertising content to be provided to users 150 associated with the audience. The advertiser 103 receives activity information indicating the number of times the advertising content was presented to users 150 associated with the audience, the number of times the users 150 in the audience interacted with the advertising content (e.g. a click through rate), and/or the number of unique users 150 in the audience the advertising content was provided to. The advertiser 103 provides funds to the insight server 100 based on the activity information. According to the embodiment, the advertiser may provide funds based on the number of times the advertising content was provided to the users, the number of times the users 150 in the audience interacted with the advertising content (e.g. a click through rate), and/or the number of unique users 150 in the audience the advertising content was provided to.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of insight server 110, the insight engine 150 or the activity engine 108 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method, comprising:
  receiving, by a server computing device comprising a processor from a second device associated with an advertiser, an interest topic and a definition of an audience of users of a video hosting site that hosts a plurality of videos, wherein a plurality of users interact with the video hosting site, wherein the interest topic corresponds to a first category of video content;
  retrieving, by the server computing device, user information and viewing information from one or more databases, wherein the user information associated with the plurality of users associated with a plurality of user devices and viewing information derived from interactions of the plurality of users via the plurality of user devices with the video hosting site;

determining, by the server computing device based on the user information and the viewing information, a subset of the plurality of users that correspond to the definition of the audience and that correspond to the interest topic, wherein the subset of the plurality of users view one or more of the plurality of videos associated with the interest topic at a frequency that is higher than a threshold frequency;

generating, by the server computing device, detailed information associated with the subset of the plurality of users, the detailed information identifying a set of videos frequently viewed by the subset of the plurality of users and associated with a second interest topic that corresponds to a second category of video content that is different from the first category, wherein the plurality of videos includes the set of videos;

transmitting, by the server computing device to the advertiser via the second device, the detailed information identifying the set of videos associated with the second interest topic; and receiving, by the server computing device from the advertiser via the second device, an item of advertising content developed based on the interest topic, the definition of the audience, and the second interest topic associated with the identified set of videos, wherein the item of advertising content is to be provided to the subset of the plurality of users via a subset of the plurality of user devices in conjunction with one or more of the plurality of videos.

2. The method of claim 1, wherein the definition of the audience of users comprises one or more of: a geographic location associated with the audience of users, an age range associated with the audience of users, or a category of video content corresponding to a viewing group associated with the audience of users.

3. The method of claim 1, wherein the definition of the audience of users comprises a gender associated with the audience of users.

4. The method of claim 1 further comprising:
retrieving search term information from the one or more databases, the search term information indicating a corresponding frequency with which each of a plurality of search terms is used by the subset of the plurality of users to query the video hosting site; and
transmitting, to the advertiser via the second device, the search term information, wherein the item of advertising content is further developed based on a search term of the plurality of search terms.

5. The method of claim 1 further comprising:
generating, based on the viewing information, video category information indicating relative interest of the subset of the plurality of users in a plurality of categories of video content, the plurality of categories comprising the second category;
transmitting, to the advertiser via the second device, the video category information; and
receiving, from the advertiser via the second device, a selection of the second category, wherein the set of videos match the second category, wherein the item of advertising content is further developed based on a third interest topic associated with a subset of the identified set of videos that is frequently watched by the subset of the plurality of users, wherein the third interest topic corresponds to a sub-category of the second category and is different from the first category.

6. The method of claim 1, wherein the detailed information further comprises a map that indicates geographical locations associated with the subset of the plurality of users.

7. The method of claim 1, wherein the detailed information further comprises a set of age ranges associated with the subset of the plurality of users, wherein at least one age range of the set of age ranges is displayed with indicia of a percentage of the subset of the plurality of users that is associated with the at least one age range.

8. The method of claim 1, wherein the detailed information further comprises indicia of a first percentage of the subset of the plurality of users that are female and indicia of a second percentage of the subset of the plurality of users that are male.

9. The method of claim 1, wherein the threshold frequency comprises an average frequency with which users view videos associated with the interest topic.

10. A method, comprising:
receiving, by a server computing device from a second device associated with an advertiser, an interest topic and a definition of an audience of users of a video hosting site that hosts a plurality of videos, wherein a plurality of users interact with the video hosting site, wherein the interest topic corresponds to a first category of video content;
retrieving, by the server computing device, user information and viewing information from one or more databases, wherein the user information is associated with the plurality of users associated with a plurality of user devices, and the viewing information is derived from interactions of the plurality of users via the plurality of user devices with the video hosting site;
determining, by the server computing device based on the user information and the viewing information, a subset of the plurality of users that correspond to the definition of the audience and that correspond to the interest topic, wherein the subset of the plurality of users play back one or more of the plurality of videos associated with the interest topic at a frequency that is higher than a threshold frequency;
generating, by the server computing device, detailed information associated with the subset of the plurality of users, the detailed information identifying a set of videos that the subset of the plurality of users frequently plays back and that is associated with a second interest topic that corresponds to a second category of video content that is different from the first category, wherein the plurality of videos includes the set of videos;
receiving, by the server computing device from the advertiser via the second device, a bid to provide an item of advertising content developed based on the interest topic, the definition of the audience, and the second interest associated with the identified set of videos; and
responsive to receiving the bid, providing, by the server computing device, the item of advertising content to the subset of the plurality of users via a subset of the plurality of user devices in conjunction with one or more of the plurality of videos.

11. The method of claim 10, wherein the definition of the audience of users comprises one or more of: a geographic location associated with the audience of users, an age range associated with the audience of users, or a category of video content corresponding to a viewing group associated with the audience of users.

12. The method of claim 10, wherein the providing the item of advertising content in conjunction with one or more of the plurality of videos comprises providing the item of advertising content to one or more users of the video hosting site in association with the set of videos based on receipt of a request from the one or more users to play back a first video of the set of videos.

13. The method of claim 10, wherein the providing the item of advertising content is in conjunction with the set of videos and is performed based on operations comprising:
monitoring a number of times one or more users of the video hosting site interacted with the item of advertising content; and
receiving funds based, in part, on the number of times the one or more users interacted with the item of advertising content.

14. The method of claim 10, wherein the providing the item of advertising content is in conjunction with the set of videos and is performed based on operations comprising:
monitoring a number of users in the subset of the plurality of users; and
receiving funds based, in part, on the number of users in the subset of the plurality of users.

15. The method of claim 10, further comprising:
generating, based on the viewing information, video category information indicating relative interest of the subset of the plurality of users in a plurality of categories of video content, the plurality of categories comprising the second category;
transmitting, to the advertiser via the second device, the video category information; and
receiving, from the advertiser via the second device, a selection of the second category, wherein the set of videos match the second category, wherein the item of advertising content is further developed based on a third interest topic associated with a subset of the identified set of videos that is frequently watched by the subset of the plurality of users, wherein the third interest topic corresponds to a sub-category of the second category and is different from the first category.

16. The method of claim 10, wherein the detailed information further comprises a set of age ranges associated with the subset of the plurality of users, wherein at least one age range of the set of age ranges is associated with a percentage of the subset of the plurality of users that is associated with the at least one age range.

17. A method, comprising:
receiving, by a server computing device comprising a processor from a second device associated with an advertiser that provides advertisements to be associated with a plurality of videos, an interest topic and a definition of an audience of users of a video hosting site that hosts the plurality of videos and the definition comprises defined demographic information about the audience of users, wherein a plurality of users interact with the video hosting site, wherein the interest topic corresponds to a first category of video content;
retrieving, by the server computing device, user information and viewing information from one or more databases, wherein the user information is associated with the plurality of users associated with a plurality of user devices, and the viewing information is derived from interactions of the plurality of users via the plurality of user devices with the video hosting site;
determining, by the server computing device based on the user information and the viewing information, a subset of the plurality of users that correspond to the definition of the audience and that correspond to the interest topic, wherein the subset of the plurality of users view one or more of the plurality of videos associated with the interest topic at a rate of occurrence that is higher than a threshold value;
generating, by the server computing device, detailed information associated with the subset of the plurality of users, the detailed information identifying a set of videos derived from interactions by one or more users of the subset of the plurality of users and associated with a second interest topic corresponds to a second category of video content that is different from the first category, wherein the plurality of videos includes the set of videos; and
transmitting, by the server computing device to the advertiser via the second device, the detailed information identifying the set of videos associated with the second interest topic; and
receiving, by the server computing device from the advertiser via the second device, an item of advertising content developed based on the interest topic, the definition of the audience, and the second interest topic associated with the identified set of videos, wherein the item of advertising content is to be provided to the subset of the plurality of users via a subset of the plurality of user devices in conjunction with one or more of the plurality of videos.

18. The method of claim 17, wherein the defined demographic information about the audience of users includes one or more of: a geographic location associated with the audience of users, gender associated with the audience of users, or an age range associated with the audience of users.

19. A computer system comprising:
a memory; and
a processor communicably coupled to the memory, the processor to execute instructions to:
receive an interest topic and a definition of an audience of users of a video hosting site from an advertiser device associated with an advertiser that provides content to be associated with a plurality of videos that hosts the plurality of videos, wherein a plurality of users interact with the video hosting site, wherein the interest topic corresponds to a first category of video content;
retrieve user information and viewing information from one or more databases, wherein the user information is associated with the plurality of users associated with a plurality of user devices, and the viewing information is derived from interactions of the plurality of users via the plurality of user devices with the video hosting site;
determine, based on the user information and the viewing information, a subset of the plurality of users that correspond to the definition of the audience and that correspond to the interest topic, wherein the subset of the plurality of users view one or more of the plurality of videos associated with the interest topic at a frequency that is higher than a threshold frequency;
generate detailed information associated with the subset of the plurality of users, the detailed information identifying a set of videos frequently viewed by the subset of the plurality of users and associated with a second interest topic that corresponds to a second category of video content that is different from the first category, wherein the plurality of videos includes the set of videos;

transmit, to the advertiser via the advertiser device, the detailed information identifying the set of videos associated with the second interest topic; and receive, from the advertiser via the advertiser device, an item of advertising content developed based on the interest topic, the definition of the audience, and the second interest topic associated with the identified set of videos, wherein the item of advertising content is to be provided to the subset of the plurality of users via a subset of the plurality of user devices in conjunction with one or more of the plurality of videos.

20. The computer system of claim 19, wherein the definition of the audience of users comprises one or more of: a geographic location associated with the audience of users, an age range associated with the audience of users, or a category of video content corresponding to a viewing group associated with the audience of users.

21. The computer system of claim 19, wherein the definition of the audience of users comprises a gender associated with the audience of users.

22. The computer system of claim 19, wherein the processor to execute instructions to:
retrieve search term information from the one or more databases, the search term information indicating a second frequency with which each of a plurality of search terms is used by the subset of the plurality of users to query the video hosting site; and
transmit, to the advertiser via the advertiser device, the search term information, wherein the item of advertising content is further developed based on a search term of the plurality of search terms.

23. The computer system of claim 19, wherein the processor to execute instructions to:
generate, based on the viewing information, video category information indicating relative interest of the subset of the plurality of users in a plurality of categories of video content, the plurality of categories comprising the second category;
transmit, to the advertiser via the advertiser device, the video category information; and
receive, from the advertiser via the advertiser device, a selection of the second category, wherein the set of videos match the second category, wherein the item of advertising content is further developed based on a third interest topic associated with a subset of the identified set of videos that is frequently watched by the subset of the plurality of users, wherein the third interest topic corresponds to a sub-category of the second category and is different from the first category.

24. The computer system of claim 19, wherein the detailed information further comprises geographic locations associated with the subset of the plurality of users.

25. The computer system of claim 19, wherein the detailed information further comprises a set of age ranges associated with the subset of the plurality of users, wherein at least one age range of the set of age ranges is displayed with indicia of a percentage of the subset of the plurality of users that is associated with the at least one age range.

26. The computer system of claim 19, wherein the detailed information further comprises indicia of a first percentage of the subset of the plurality of users that are female and indicia of a second percentage of the subset of the plurality of users that are male.

27. A computer system, comprising:
a memory that stores computer executable components; and
a processor communicably coupled to the memory, the processor to execute instructions to:
receive, from an advertiser, an interest topic and a definition of an audience of users of a video hosting site that hosts a plurality of videos, wherein a plurality of users interact with the video hosting site;
retrieve user information and viewing information from one or more databases, wherein the user information is associated with the plurality of users associated with a plurality of user devices, and the viewing information is derived from interactions of the plurality of users via the plurality of user devices with the video hosting site, wherein the interest topic corresponds to a first category of video content;
determine, based on the user information and the viewing information, a subset of the plurality of users that correspond to the definition of the audience and that correspond to the interest topic, wherein the subset of the plurality of users play one or more of the plurality of videos associated with the interest topic at an occurrence rate that is higher than a threshold value;
generate detailed information associated with the subset of the plurality of users, the detailed information identifying a set of videos that the subset of the plurality of users frequently plays and that are associated with a second interest topic that corresponds to a second category of video content that is different from the first category, wherein the plurality of videos includes the set of videos;
transmit, to the advertiser, the detailed information identifying the set of videos associated with the second interest topic;
receive, from the advertiser, a bid to provide an item of advertising content developed based on the interest topic, the definition of the audience, and the second interest topic associated with the identified set of videos; and
responsive to receiving the bid, provide the item of advertising content to the subset of the plurality of users via a subset of the plurality of user devices in conjunction with one or more of the plurality of videos that the subset of the plurality of users plays.

28. The computer system of claim 27, wherein the definition of the audience of users comprises one or more of: a geographic location associated with the audience of users, an age range associated with the audience of users, or a category of video content corresponding to a viewing group associated with the audience of users.

29. The computer system of claim 27, wherein the processor further executes instructions to:
receive requests from one or more users associated with the audience of users to play one or more videos from the plurality of videos; and
provide the item of advertising content to the one or more users in association with the one or more videos.

30. The computer system of claim 27, wherein the processor further executes instructions to:
monitor a number of times the subset of the plurality of users interacted with the item of advertising content; and
receive funds based, in part, on the number of times the one or more users interacted with the item of advertising content.

31. The computer system of claim 30, wherein the processor further executes instructions to:

monitor a number of the subset of the plurality of users the item of advertising content is provided to; and receive funds based, in part, on the number of the subset of the plurality of users to which the item of advertising content is provided.

32. The computer system of claim 27, wherein the processor further executes instructions to provide indicia of a first set of videos associated with the first category of video content that is frequently played by the audience.

33. The computer system of claim 32, wherein the processor further executes instructions to provide indicia of a second set of videos associated with the second category of video content that are frequently played by the audience, wherein the first category is different from the second category.

34. The computer system of claim 27, wherein the processor further executes instructions to provide a set of search terms that are frequently used by the subset of the plurality of users.

35. The computer system of claim 27, wherein the processor further executes instructions to provide a set of age ranges associated with the subset of the plurality of users, wherein at least one age range of the set of age ranges is associated with a percentage of the subset of the plurality of users that is associated with the at least one age range, wherein the processor further executes instructions to transmit, to the advertiser, detailed information comprising the set of age ranges.

* * * * *